(12) United States Patent
Chiu

(10) Patent No.: US 9,856,994 B2
(45) Date of Patent: Jan. 2, 2018

(54) ADJUSTABLE CONNECTOR FOR REFRIGERANT PIPE

(71) Applicant: Sheng Yung Chiu, Taichung (TW)

(72) Inventor: Sheng Yung Chiu, Taichung (TW)

( * ) Notice: Subject to any disclaimer, the term of this patent is extended or adjusted under 35 U.S.C. 154(b) by 0 days.

(21) Appl. No.: 15/165,157

(22) Filed: May 26, 2016

(65) Prior Publication Data

US 2017/0343128 A1  Nov. 30, 2017

(51) Int. Cl.
  *F16K 1/30* (2006.01)
  *F16K 31/50* (2006.01)
  *F16K 31/56* (2006.01)
  *F16L 37/23* (2006.01)

(52) U.S. Cl.
  CPC ............ *F16K 31/508* (2013.01); *F16K 1/302* (2013.01); *F16K 31/566* (2013.01); *F16L 37/23* (2013.01); *Y10T 137/87949* (2015.04); *Y10T 137/87965* (2015.04)

(58) Field of Classification Search
  CPC ...... F16K 31/508; F16K 31/566; F16K 1/302; F16L 37/23; F16L 37/28–37/47; Y10T 137/87949; Y10T 137/87965
  USPC .............. 251/263, 149.1–149.7; 137/614.03, 137/614.05
  See application file for complete search history.

(56) References Cited

U.S. PATENT DOCUMENTS

| 2,739,612 | A | * | 3/1956 | Hansen | F16K 31/50 137/614.05 |
|---|---|---|---|---|---|
| 4,009,729 | A | * | 3/1977 | Vik | F16L 37/23 137/614.05 |
| 4,166,606 | A | * | 9/1979 | Kawolics | F16K 41/04 251/214 |
| 4,347,870 | A | * | 9/1982 | Maldavs | F16L 37/23 137/614.05 |
| 4,535,802 | A | * | 8/1985 | Robertson | F16K 31/52408 251/263 |
| 5,080,132 | A | * | 1/1992 | Manz | F16L 37/1215 137/614.04 |
| 5,139,049 | A | * | 8/1992 | Jensen | F16L 37/34 137/614.03 |
| 5,415,200 | A | * | 5/1995 | Haunhorst | F16L 37/36 137/614.03 |
| 5,603,353 | A | * | 2/1997 | Clark | F16L 37/23 137/614.01 |
| 6,637,460 | B2 | * | 10/2003 | Haunhorst | F16L 37/23 137/614.03 |
| 6,837,064 | B2 | * | 1/2005 | Knowles | F16L 37/23 137/614.06 |
| 6,868,994 | B2 | * | 3/2005 | Kawolics | F16K 31/52 222/105 |

(Continued)

*Primary Examiner* — John Bastianelli

(74) *Attorney, Agent, or Firm* — C. G. Mersereau; Nikolai & Mersereau, P.A.

(57) ABSTRACT

An adjustable connector for refrigerant pipe includes a body, a valve pin is inserted into the body, and the body includes a quick-release assembly and a driving member respectively disposed on a mounting part and an installation part thereof. When the driving member is operated to suppress the pressed end of the valve pin to move the pushing end close to the pocket, the valve spout is opened to pass the refrigerant. Besides, when the driving member is operated to not suppress the pressed end by jumping off itself quickly, the pushing end is moved away from the pocket, so that the valve spout is closed to block the refrigerant.

8 Claims, 9 Drawing Sheets

(56) References Cited

U.S. PATENT DOCUMENTS 6,962,319 B2 * 11/2005 Zheng .................. B67D 1/1466
222/153.14

* cited by examiner

ADJUSTABLE CONNECTOR FOR REFRIGERANT PIPE

TECHNICAL FIELD

The present disclosure relates to an adjustable connector, more particularly to a connector which is applied to connect a valve spout of a refrigerant pipe for refrigerant-refilling.

RELATED ART

Please refer to FIG. 9, which is a conventional connector for connecting with a valve spout of a refrigerant pipe. In the connector, a body 91 has a mounting part 92 disposed at one end thereof and configured to mount the valve spout 93, and has one knob 94 disposed at the other end thereof, where the knob 94 is linked to a valve pin 95 which is inserted into the body 91. By manner of rotating the button 94 to move the valve pin 95 towards the valve spout 93, a thimble 96 inside the valve spout 93 is pushed by the valve pin 95, so as to refill the refrigerant pipe with the refrigerant. After refrigerant-refilling is completed, the knob 94 is rotated in an opposite direction to release the push of the valve pin 95 against the punch pin 96, so as to block communication between the body 91 and the refrigerant pipe.

The aforesaid refrigerant is highly flammable. If the refrigerant is accidently escaped to the outside when the body 91 is in communication with the refrigerant pipe, an operator must rotate the knob 94 quickly to move the valve pin 95 back, so as to avoid the refrigerant from contacting with fire source to cause ignition. However, it's difficult to complete the action of rotating the button 94 to release the valve pin 95 in a short period of time. Therefore, the time period in which the refrigerant is escaped cannot be shortened, and the risk of the ignition caused by the escaped refrigerant contacting with the file is raised relatively.

Besides, when the body 91 is mounted with the valve spout 93 by the mounting part 92 thereof, a fixing device is required for fixing. For example, as show in FIG. 9 the mounting part 92 and the valve spout 93 are fixed by the sliding sleeve 97 and hardly departed from each other. However, if the sliding sleeve 97 is touched it may be moved toward the button 94 easily, which causes the mounting part 92 and the valve spout 93 to be easily separated from each other. Thus, the problem of escaping the refrigerant may be generated.

SUMMARY

The major objective of the present disclosure is to provide an adjustable connector for solving the aforementioned problems. When being mounted on the valve spout of the refrigerant pipe, the adjustable connector may be separated from the refrigerant pipe quickly when it is found that the refrigerant is escaped, so as to reduce the time of escaping the refrigerant and reduce the risk of generating the ignition by contacting the refrigerant with the fire source. In addition, it makes sure that the adjustable connector cannot be separated from the valve spout easily, so the problem of escaping the refrigerant may be solved effectively.

The present disclosure provides an adjustable connector which is used to connect a valve spout of a refrigerant pipe for refrigerant-refilling. In order to achieve the aforesaid objective, the adjustable connector of the present disclosure includes a body, a valve pin, a quick-release assembly and a driving member.

The body has a cylindrical form with a chamber and has a mounting part and an installation part respectively disposed at two ends thereof. The mounting part is used for mounting the valve spout. In the body, a communication part is disposed between the mounting part and the installation part for gas flow through the chamber. The body has a pocket disposed at the end with the mounting part, where the pocket is in communication with the chamber.

The valve pin is axially movably inserted into the chamber of the body, and has a pushing end close to the pocket and has a pressed end extended to the installation part.

The quick-release assembly has a sliding sleeve disposed on an outer periphery of the mounting part of the body. The sliding sleeve is operative to move backwards toward the installation part into a stroke on the mounting part, so as to release the valve spout.

The driving member is disposed on the installation part, and configured to suppress the pressed end to move the pushing end close to the pocket, or quickly release its suppression against the pressed end to enable the pushing end to move far away from the pocket.

DETAILED DESCRIPTION

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

Please refer to FIG. 1 to FIG. 8, which respectively illustrate the embodiments of the present disclosure, and the present figures are not limited thereto of the present disclosure.

Figure 1:
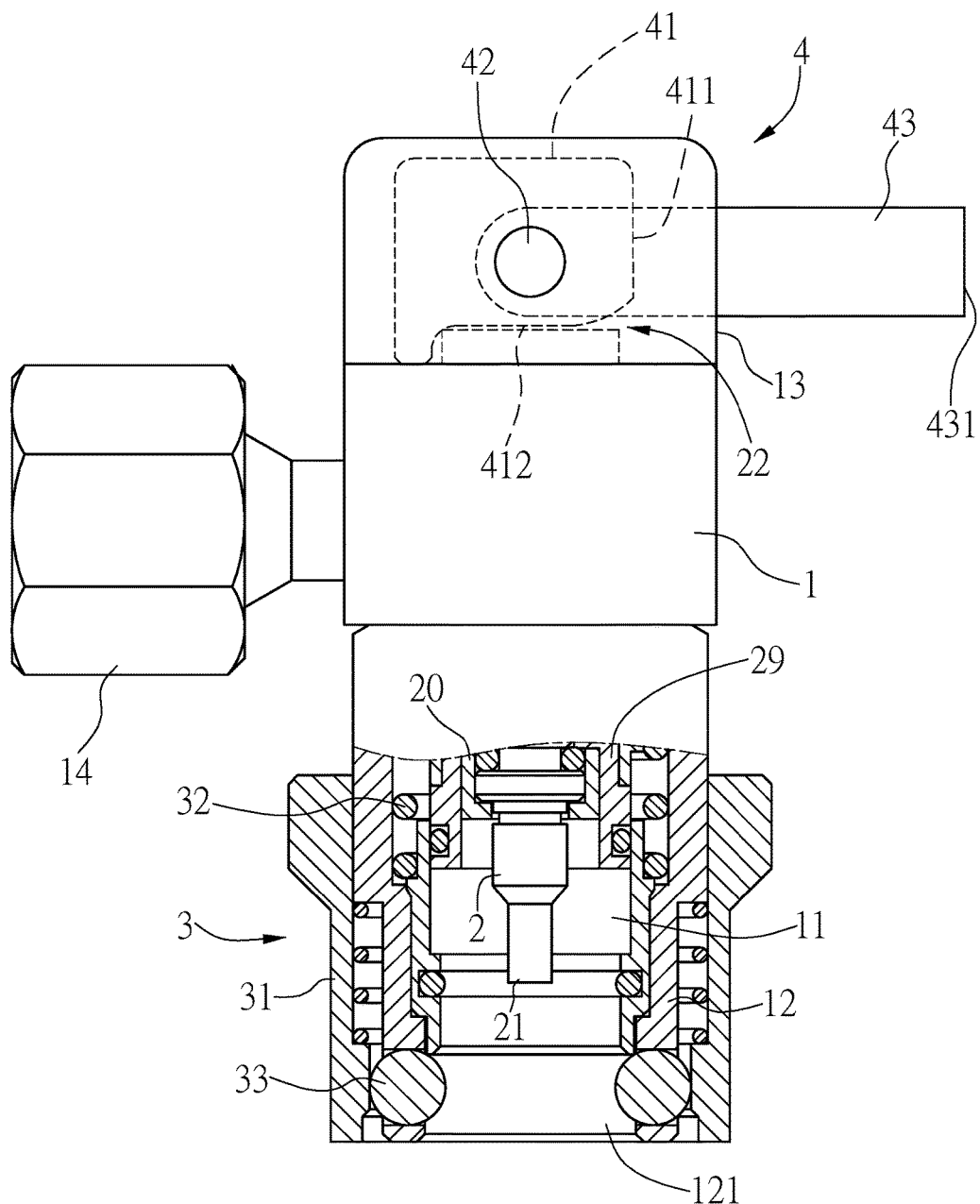
FIG. 1 is a plane view of a structure of an adjustable connector of the present disclosure.
Figure 3:
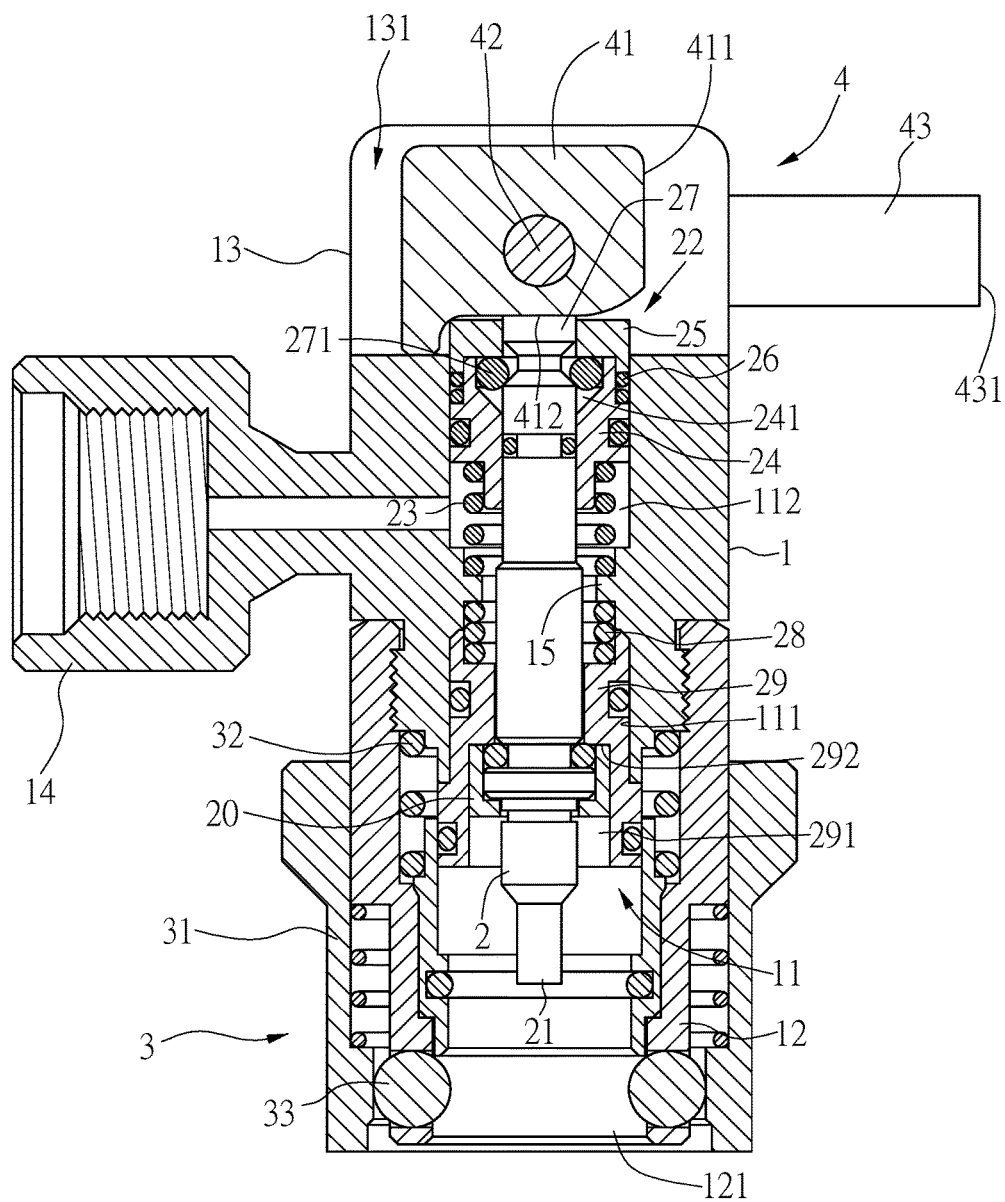
FIG. 3 is a cross-sectional view of the structure of the adjustable connector of the present disclosure, illustrating that the pivot block does not suppress the pressed end, to enable the pushing end to move away from the pocket.

The present embodiment provides an adjustable connector which is configured to connect with a valve spout of a refrigerant pipe for refrigerant-refilling. As shown in FIG. 1 to FIG. 3, the adjustable connector includes a body 1, a valve pin 2, a quick-release assembly 3 and a driving member 4.

Figure 2:
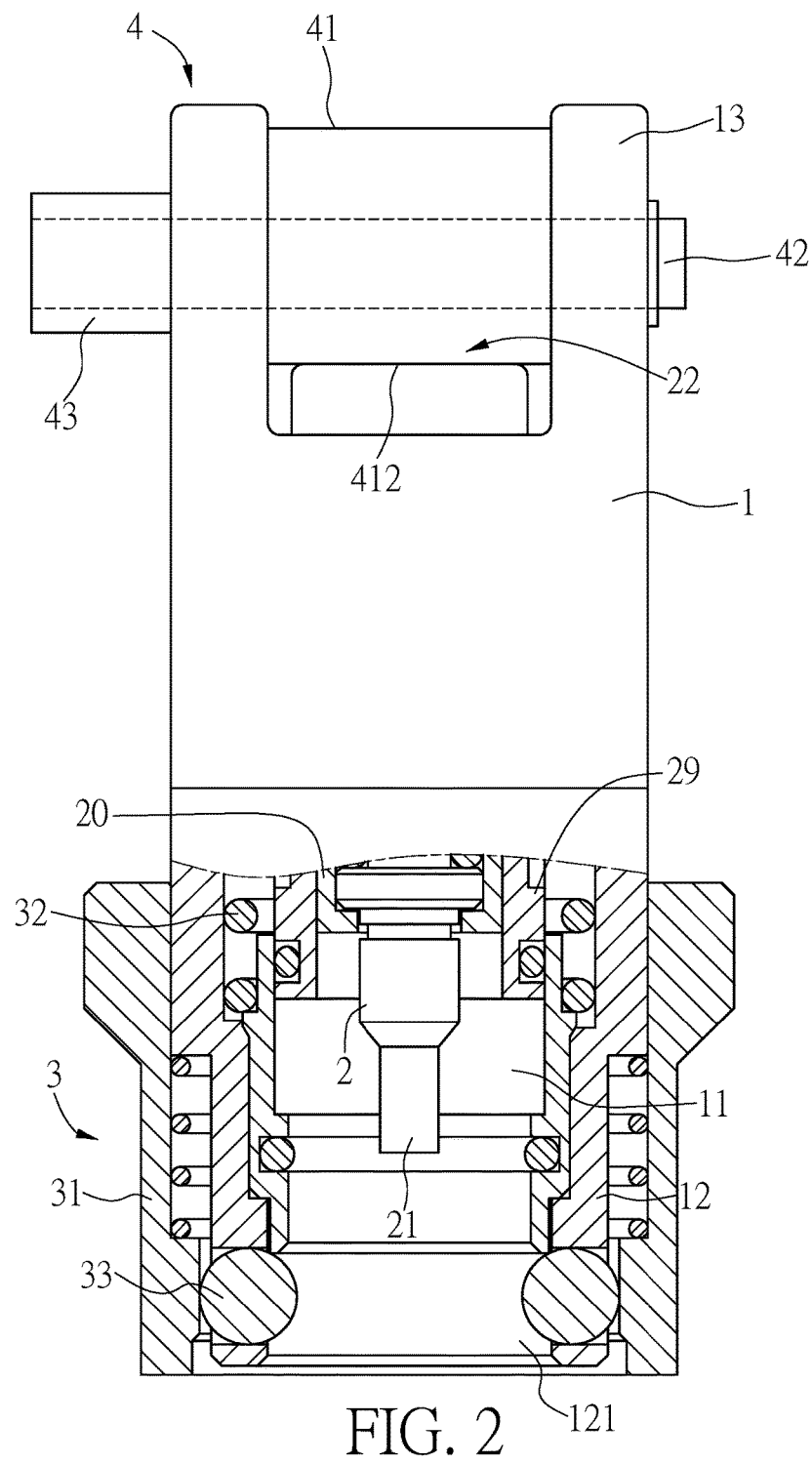
FIG. 2 is another plane view of the structure of the adjustable connector of the present disclosure, when viewed by 90 degrees different from FIG. 1.

As illustrated in FIG. 1 and FIG. 2, the body 1 has a cylindrical form with a chamber 11, and has a mounting part 12 and an installation part disposed at two ends thereof. In the present embodiment, the installation part is a pivot connection part 13. The mounting part 12 of the body 1 is configured to be mounted by the valve spout. The pivot connection part 13 has a recess 131, and the recess 131 forms the pivot connection part 13 in the body 1. The body 1 has a communication part 14 between the mounting part 12 and the pivot connection part 13 for gas flow in or out of the chamber 11. The body 1 has a pocket 121 disposed at the end with the mounting part 12. The pocket 121 is in communication with the chamber 11, and also in communication with the communication part 14 through the chamber 11.

As illustrated in FIG. 1 and FIG. 2, the valve pin 2 is axially movably inserted into the chamber 11 of the body 1. The valve pin 2 includes a pushing end 21 and a pressed end 22, where the pushing end 21 is located close to the pocket 121 and the pressed end 22 is inserted into the installation part. In the present embodiment, the valve pin 2 is exposed out of the recess 131 of the pivot connection part 13.

As shown in FIG. 1 and FIG. 2, the quick-release assembly 3 includes a sliding sleeve 31 mounted on an outer periphery of the mounting part 12 of the body 1. The valve spout is released when the sliding sleeve 31 is moved backwardly to the connection part 13 on the mounting part 12 into a stroke, so as to separate the body 1 from the valve spout. In the present embodiment, the quick-release assembly 3 further includes a spring 32 installed between the mounting part 12 and the sliding sleeve 31 and configured to push the sliding sleeve 31 forwardly in a normal state. The quick-release assembly 3 also includes a plurality of beads 33 disposed around the mounting part 12, and the plurality of beads 33 are configured to stop the aforesaid valve spout, so as to fix the valve spout in the mounting part 12 of the body 1.

As shown in FIG. 1 and FIG. 2, in the present embodiment, the driving member 4 includes a pivot block 41 axially disposed on the pivot connection part 12 in the radial direction of the body 1 by a rotation shaft 42, and the pivot block 41 is disposed in the recess 131 at this time. Besides, the rotation shaft 42 is linked to a poke rod 43 by one end thereof. The poke rod 43 is disposed on the outer periphery of the body 1 and configured to rotate the pivot block 41 simultaneously. The poke rod 43 has a block end 431 distal to the rotation shaft 42. In present embodiment, the pivot block 41 is a rectangle block and has a first surface 411 and a second surface 412 adjacent to each other. A distance between the first surface 411 and the rotation shaft 42 is longer than a distance between the rotation shaft 42 and the pressed end 22, and a distance between the second surface 412 and the rotation shaft 42 is equal to the distance between the rotation shaft 42 and the pressed end 22. In other embodiments, the distance between the second surface 412 and the rotation shaft 42 may be shorter than the distance between the rotation shaft 42 and the pressed end 22.

Figure 4:
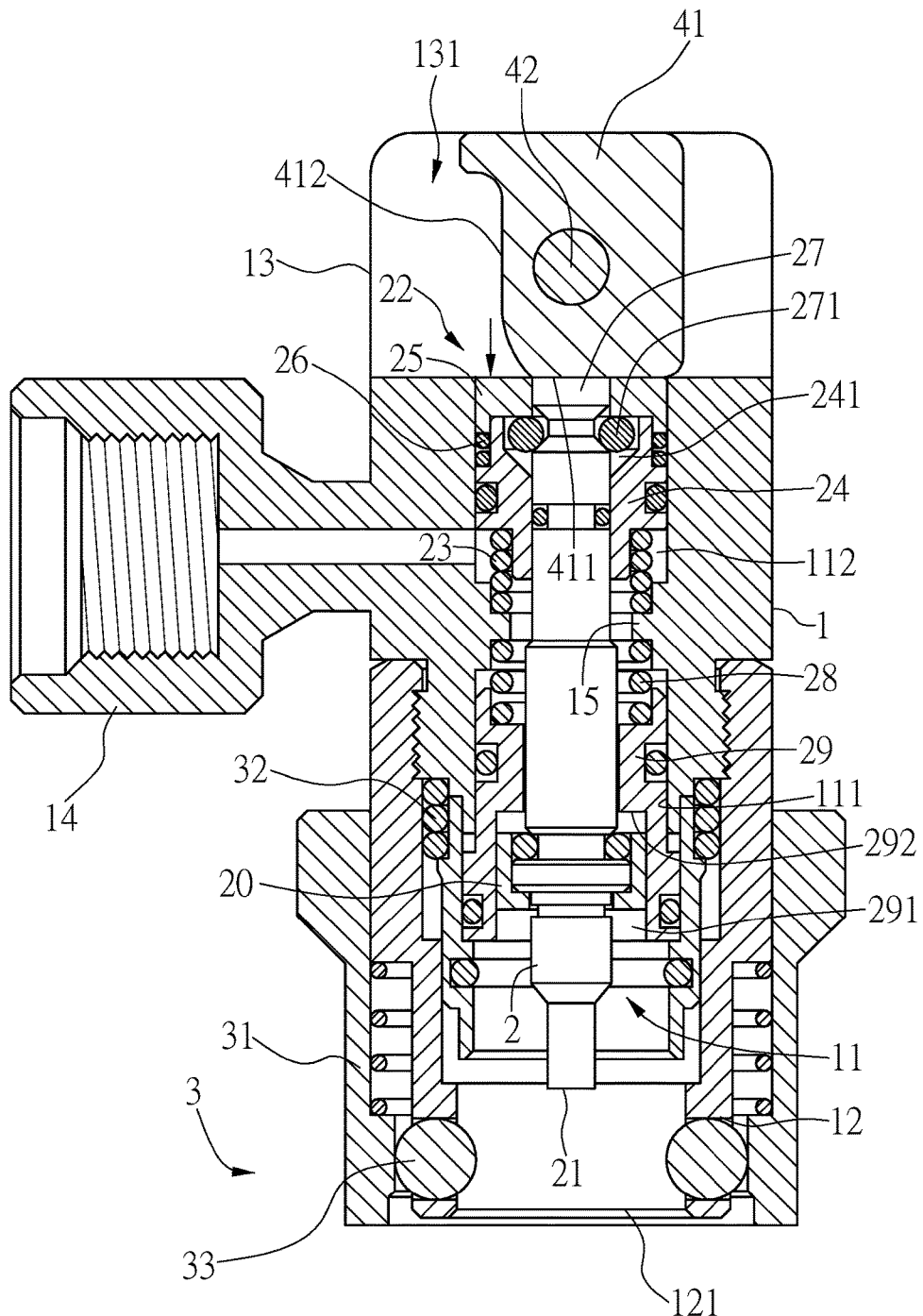
FIG. 4 is a cross-sectional view of the structure of the adjustable connector of the present disclosure, illustrating that the pivot block suppresses the pressed end to move the pushing end close to the pocket.

As illustrated in FIG. 3 and FIG. 4, the body 1 of the present embodiment has a small-diameter part 15 between the mounting part 12 and the pivot connection part 13. The chamber 11 is separated into a front section 111 and a back section 112 by the small-diameter part 15, where the front section 111 is close to the mounting part 12 and the back section 112 is close to the pivot connection part 13. A rear compression spring 23 and a rear piston member 24 are disposed in the rear section 112 in a sequential order. The valve pin 2 is inserted through the rear piston member 24 and fastened with the rear piston member 24 by a rear end thereof. A part of the rear piston member 24 is exposed out of the recess 131 and used as the pressed end 22. As shown in FIG. 4, when the pivot block 41 suppresses the pressed end 22 to move the pushing end 21 close to the pocket 121, the rear compression spring 23 is moved into the rear section 112 along with the rear piston member 24 and is compressed to gather power. As shown in FIG. 3, when the pivot block 41 does not suppress the pressed end 22 to enable the pushing end 21 to move away from the pocket 121, the rear piston member 24 is pushed by a recurrent force generated by the rear compression spring 23, and the pressed end 22 is moved from the rear section 112 and back to its original position, so as to act the valve pin 2 in the chamber 11 of the body 1 in a reciprocate displacement simultaneously along with rotating of the poke rod 43.

In the present embodiment, the rear piston member 24 includes a lid 25 disposed at the pressed end 22 thereof, and a compression spring 26 is disposed between the lid 25 and the rear piston member 24. The rear piston member 24 has a groove part 241 recessed at the end thereof facing backwardly. The rear part of the valve pin 2 is formed with a fixing end 27 which is constrained in the groove part 241 by a plurality of circular beads 271 and fastened with the rear piston member 24.

In the present embodiment, a front compression spring 28 and a front piston member 29 are disposed in the front section 111 in a sequential order. The front piston member 29 has a groove part 291 recessed at an end thereof facing forwardly. A groove base 292 is formed at the bottom of the groove part 291 and the valve pin 2 includes a block ring 20 disposed in the groove part 291, Hereby, when the pivot block 41 does not suppress the pressed end 22 as aforesaid, the front piston member 29 is pushed forwardly by the front compression spring 28 to press tightly against the block ring 20 by the groove base 292 thereof. At the same time, the valve pin 2 is pushed backwardly by the rear compression spring 23 to press the block ring 20 tightly against the groove base 292, so that the communication part 14 and the pocket 121 are not in communication with each other. Besides, when the pivot block 41 suppresses the pressed end 22 as aforesaid, the block ring 20 is moved forwardly along with the valve pin 2 to leave the groove base 292, so that the communication part 14 and the pocket 121 are in communication with each other.

Figure 5:
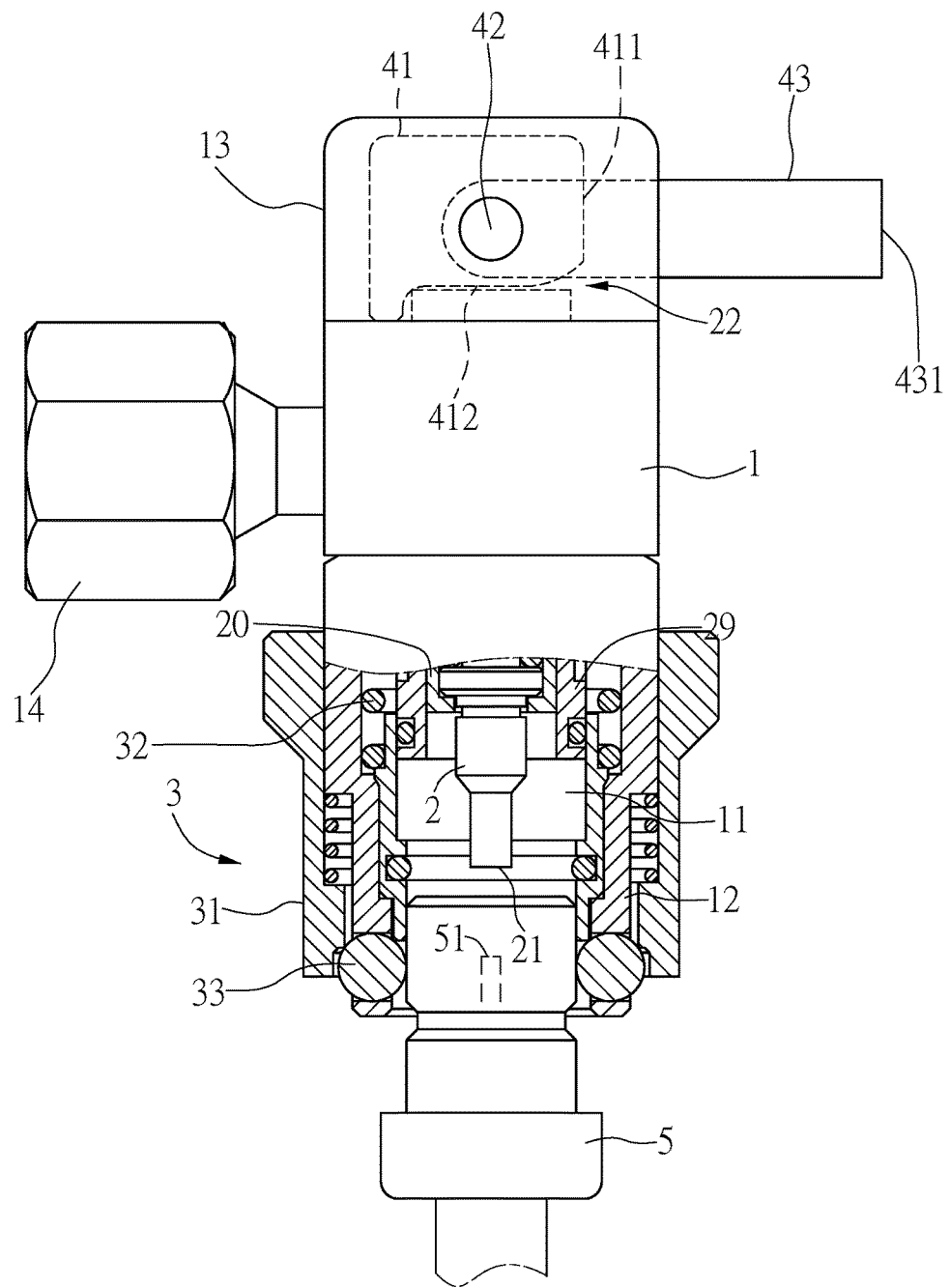
FIG. 5 is a plane view of linking a valve spout of a refrigerant pipe with a mounting part of a body of the adjustable connector of the present disclosure.

Before the refrigerant is refilled into the refrigerant pipe, the sliding sleeve 31 is moved backwardly toward the pivot connection part 13, and the pocket 121 of the mounting part 12 is in alignment with the valve spout 5 and mounted with the valve spout 5. Next, the sliding sleeve 31 is released to move forwardly and back to its original position. The above situation is illustrated in FIG. 5, and the body 1 is immovable after being linked to the valve spout 5 by the mounting part 12.

Figure 6:
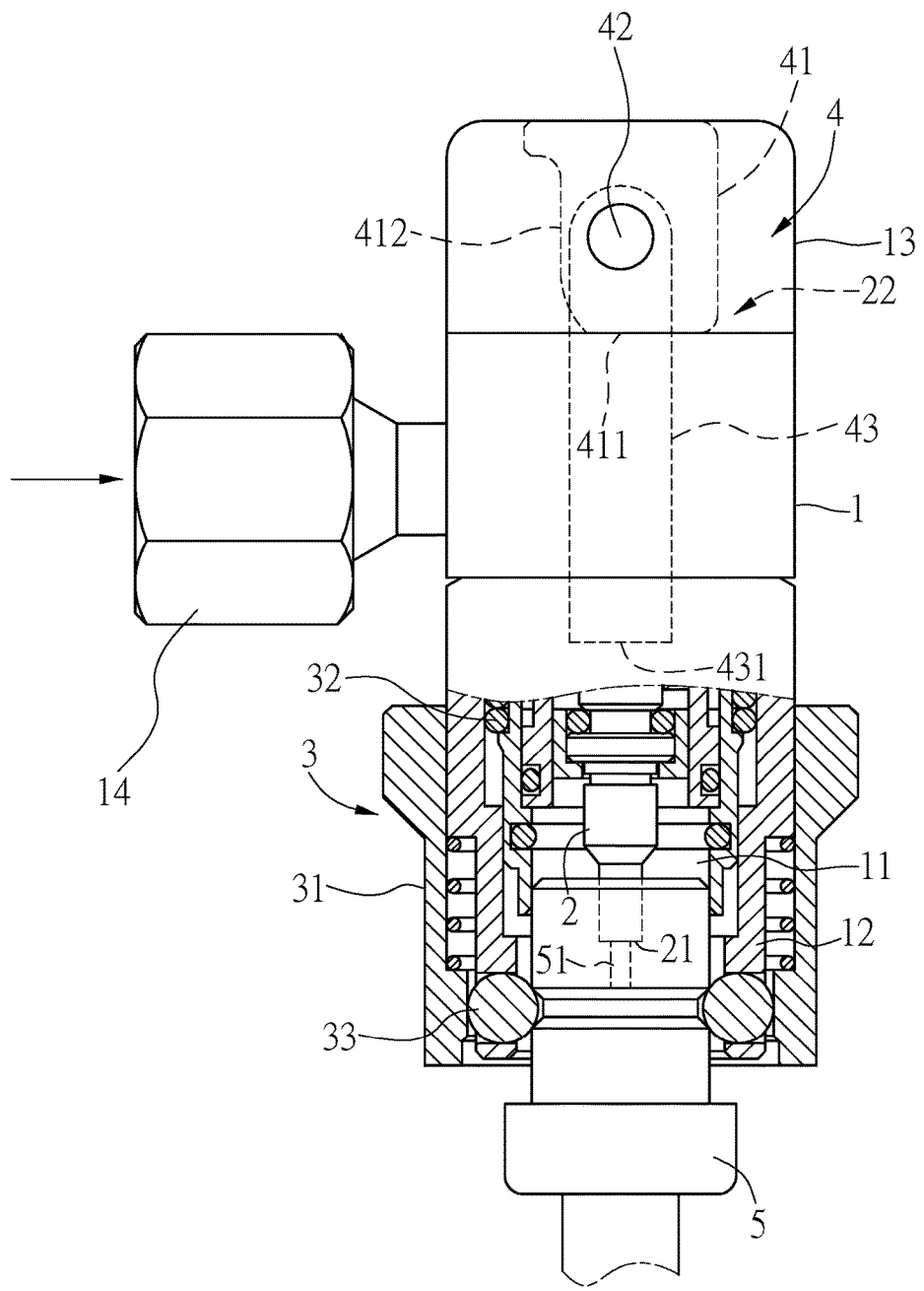
FIG. 6 is a plane view of rotating a poke rod to be along the axial of a body shown in FIG. 5.
Figure 7:
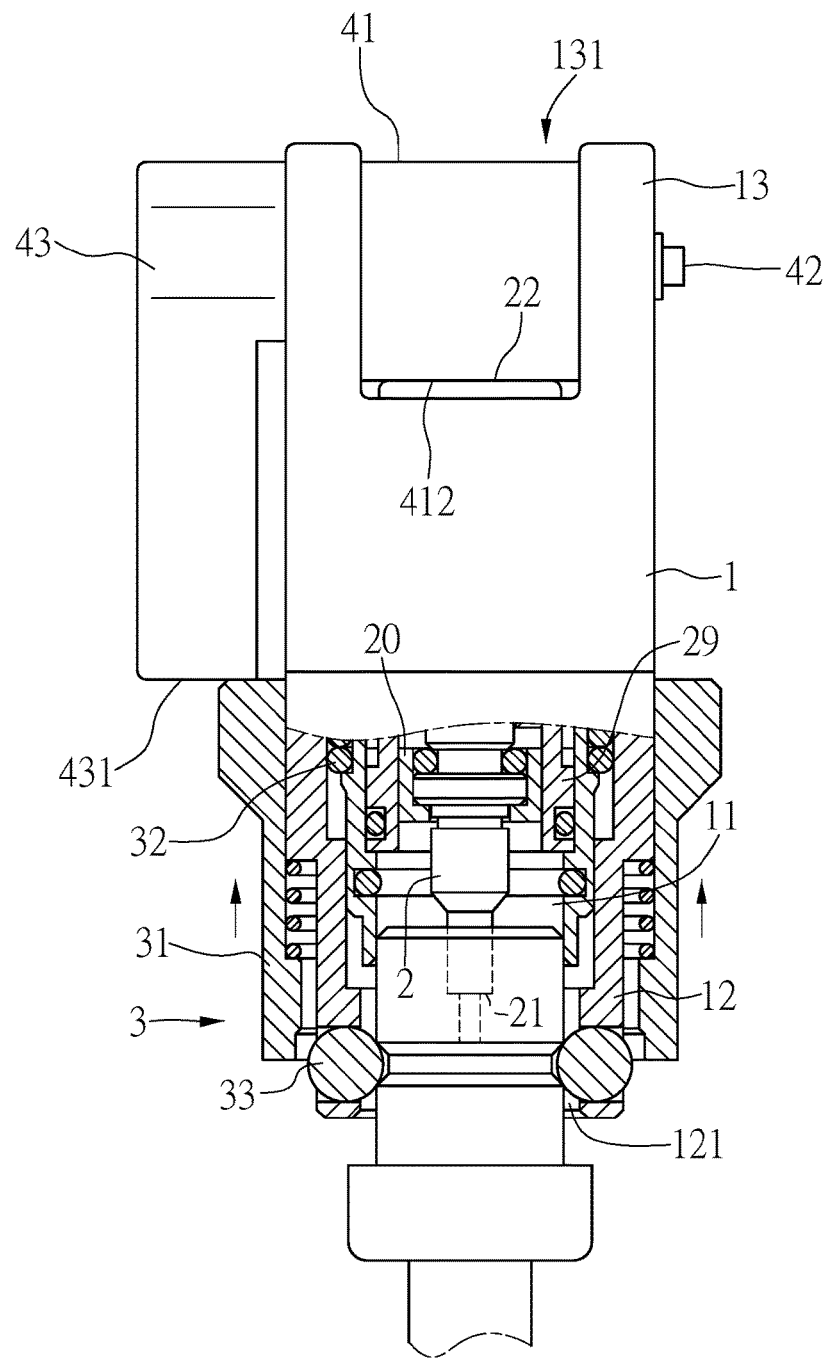
FIG. 7 is another plane view of the structure of the adjustable connector of the present disclosure, when viewed by 90 degrees different from FIG. 6, and illustrating that a sliding sleeve is stopped by a block end of the poke rod when being moved toward the pivot connection part.

As shown in FIG. 6, when the refrigerant pipe is refilled stuffed by the refrigerant, the poke rod 43 is rotated to be along the axial direction of the body 1, the first surface 411 of the pivot block 41 is rotated to face the pressed end 22 and suppress the pressed end, so that the pushing end 21 is moved close to the pocket 121 to push the thimble 51 in the valve spout 5 to make the chamber 11 in communication with the refrigerant pipe. Therefore, the refrigerant can be refilled into the refrigerant pipe. At this time, as shown in FIG. 7, the poke rod 43 is rotated to be along the axial direction of the body 1, and the block end 431 is within the range of the stroke of the sliding sleeve 31, so the sliding sleeve 31 can be stopped by the block end 431 before the sliding sleeve 31 is moved backwardly to reach the range of the stroke.

Figure 8:
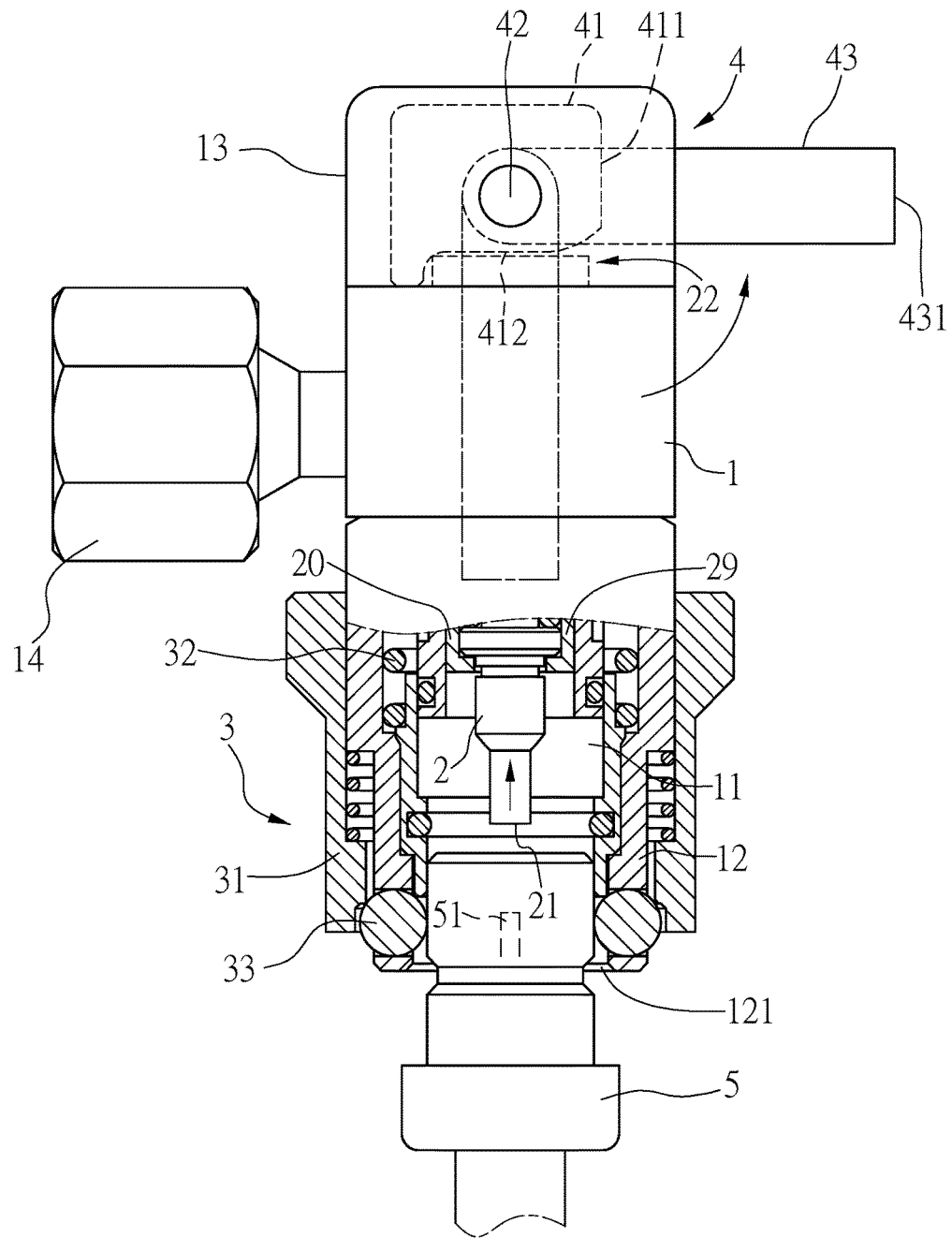
FIG. 8 is a schematic view of rotating the poke rod away from the axial direction of the body shown in FIG. 6.
Figure 9:
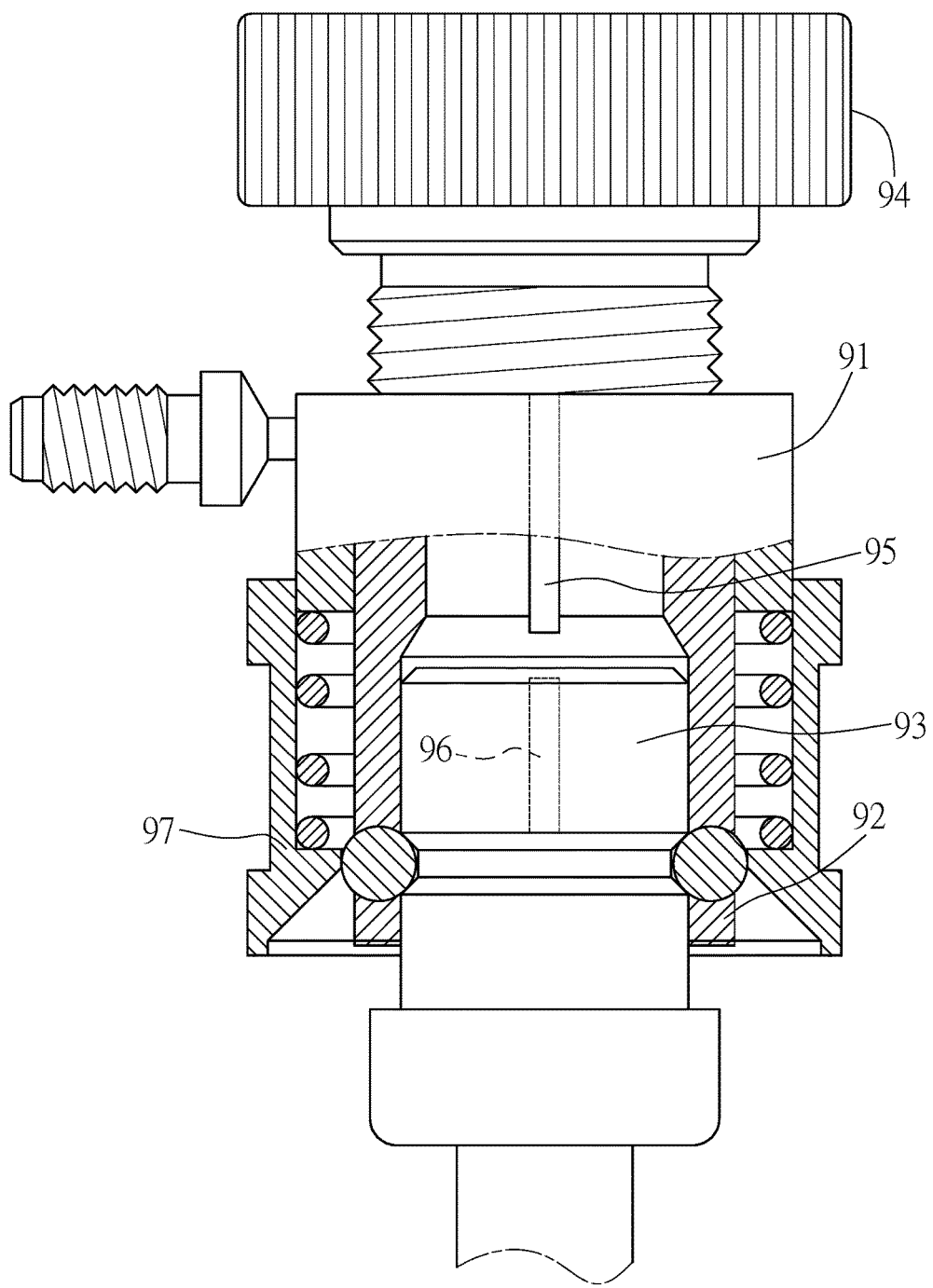
FIG. 9 is a plane view of linking a valve spout of a refrigerant pipe with a conventional connector.

As shown in FIG. 8, when the poke rod 43 is rotated to leave the axial direction of the body 1, the second surface 412 of the pivot block 41 is rotated to face the pressed end 22 and not suppress the pressed end 22, so as to move the pushing end 21 away from the pocket 121. Therefore, when the refrigerant accidently escapes in the process of refilling the refrigerant, an operator can poke the poke rod 43 immediately to leave the poke rod 43 from the axial direction of the body 1 and, in the meantime, the pivot block 41 is rotated instantly to face the pressed end 22 by the second surface 412 rather than the first surface 411. The pressed end 22 is changed to a non-suppressed status from a suppressed status, so the pushing end 21 of the valve pin 2 is stopped pushing the thimble 51.

It's easy to understand the advantages of the present disclosure according to the aforementioned descriptions. If the refrigerant is escaped, the operation of the driving member 4 installed on the body 1 is able to separate from the refrigerant pipe quickly, so as to reduce the time of escaping the refrigerant. The, the risk of the ignition generated by contacting the escaped refrigerant with the file source may be reduced. Besides, by rotating the poke rod 43 to be along the axial direction of the body 1, the block end 431 can be within the range of the stroke of the sliding sleeve 31, so as to make sure that the adjustable connector 1 cannot be decoupled from the valve spout 5 easily. As a result, the problem of escaping the refrigerant may be solved.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An adjustable connector for refrigerant pipe, applied to connect a valve spout of a refrigerant pipe for refrigerant-refilling, comprising:
    a body having a cylindrical form with a chamber and having a mounting part and an installation part respectively disposed at two ends thereof, the mounting part configured to be mounted with the valve spout, the body having a communication par between the mounting part and the installation part for gas flow through the chamber, and the body having a pocket disposed at the end thereof with the mounting part, and the pocket in communication with the chamber;
    a valve pin axially movably inserted into the chamber of the body and having a pushing end close to the pocket and having a pressed end inserted into the installation part;
    a quick-release assembly having a sliding sleeve disposed on an outer periphery of the mounting part of the body, wherein the valve spout is released when the sliding sleeve is moved backwardly towards the installation part into a stroke on the mounting part; and
    the driving member comprises a pivot block disposed in the installation part and axially installed with the installation part in the radial direction of the body by a rotation shaft, the rotation shaft has an end exposed out of the body to link with a poke rod, and the poke rod and the pivot block are rotatable simultaneously, the poke rod has a block end distal to the rotation shaft;
    wherein when the poke rod is rotated to be along the axial of the body, the pivot block suppresses the pressed end to move the pushing end close to the pocket relatively, and the block end stands within the range of the stroke to stop the sliding sleeve from moving backwardly;
    wherein when the poke rod is rotated to leave the axial direction of the body, the pivot block does not suppress the pressed end, so as to enable the pushing end to move away from the pocket.

2. The adjustable connector for refrigerant pipe of claim 1,
    wherein the installation part is a pivot connection part formed with a recess, the pivot block disposed in the recess and axially installed with the pivot connection part in the radial direction of the body by the rotation shaft.

3. The adjustable connector for refrigerant pipe of claim 2, wherein the pivot block is a rectangle block and has a first surface and a second surface adjacent to each other, a distance between the first surface and the rotation shaft is longer than a distance between the rotation shaft and the pressed end, a distance between the second surface and the rotation shaft is shorter than or equal to the distance between the rotation shaft and the pressed end;
    wherein when the poke rod is rotated to be along the axial of the body, the first surface of the pivot block is rotated to face the pressed end by the first surface thereof and suppress the pressed end, and when the poke rod is rotated to leave the axial of the body, the second surface of the pivot block is rotated to face the pressed end by the second surface and not suppress the pressed end.

4. The adjustable connector for refrigerant pipe of claim 2, wherein the quick-release assembly comprises a spring mounted between the mounting part and the sliding sleeve and configured to push the sliding sleeve moving forwardly in a normal state, and a plurality of beads are disposed around the mounting part to stop the valve spout.

5. The adjustable connector for refrigerant pipe of claim 2, wherein the body comprises a small-diameter part between the mounting part and the pivot connection part, the chamber is separated by the small-diameter part into a front section close to the mounting part, and a back section close to the pivot connection part;
    wherein a rear compression spring and a rear piston member are disposed in the rear section in a sequential order, the valve pin is inserted through the rear piston member and fastened with the rear piston member by a rear end thereof, a part of the rear piston member is exposed out of the recess and used as the pressed end;
    wherein, when the pivot block suppresses the pressed end to move the pushing end close to the pocket, the rear compression spring is moved into the rear section along with the rear piston member and compressed to gather power, and when the pivot block does not suppress the pressed end to enable the pushing end to move away from the pocket, the rear piston member is pushed by a recurrent force generated by the rear compression spring, the pressed end is moved out the rear section and back to its original position, so as to act the valve pin in the chamber of the body in a reciprocate displacement simultaneous to rotating of the poke rod.

6. The adjustable connector for refrigerant pipe of claim 5, wherein a front compression spring and a front piston member are disposed into the front section in a sequential order, the front piston member has a groove part recessed at an end thereof facing forwardly, a groove base is formed at the bottom of the groove part, the valve pin has a block ring disposed in the groove part;
- wherein, when the pivot block does not suppress the pressed end, the front piston member is pushed forwardly by the front compression spring to press tightly against the block ring by the groove base thereof, the valve pin is pushed backwardly by the rear compression spring to abut the block ring tightly against the groove base, so that the communication part and the pocket are not communicated with each other;
- wherein when the pivot block suppresses the pressed end, the block ring is moved forwardly along with the valve pin to leave the groove base, so that the communication part and the pocket are in communication with each other.

7. The adjustable connector for refrigerant pipe of claim 5, wherein the rear piston member comprises a lid at the pressed end thereof and a compression spring is disposed between the lid and the piston member.

8. The adjustable connector for refrigerant pipe of claim 5, wherein the rear piston member has a groove part recessed at an end thereof facing backwardly, a rear part of the valve pin is formed with a fixing end which is constrained in the groove part by a plurality of circular beads and fastened with the rear piston member.

* * * * *